United States Patent [19]
Couch

[11] Patent Number: 6,029,707
[45] Date of Patent: Feb. 29, 2000

[54] WATER HANDLING SYSTEM

[76] Inventor: Ernest C. Couch, 14 Park Terrace Dr., Hannibal, Mo. 63401

[21] Appl. No.: 09/184,210

[22] Filed: Nov. 2, 1998

[51] Int. Cl.$^7$ .................................................. B60R 15/04
[52] U.S. Cl. .......................... 137/899; 137/565.37; 4/323
[58] Field of Search .............................. 137/351, 565.01, 137/565.37, 571, 899; 4/323

[56]  References Cited

U.S. PATENT DOCUMENTS

| 3,040,333 | 6/1962 | Merrill ........................................ 4/323 |
| 3,811,462 | 5/1974 | Feliz ......................................... 137/240 |
| 3,871,399 | 3/1975 | Watson .................................... 137/899 |

*Primary Examiner*—John Fox

[57] ABSTRACT

A water handling system including a black water drain line for draining a black water tank including an operator controlled slide valve in such line; a grey water drain line for draining a grey water tank including an operator controlled slide valve in such line; a termination drain line coupling the outlets of both the black water drain line and the grey water drain line, the termination drain line having screw threads on its outlet end; a grey water tank positionable in the bed of a truck; a hose with a threaded inlet end and a threaded outlet end couplable to the grey water tank; a pump having a threaded inlet end and an outlet end with an adapter having threads couplable to the inlet end of the hose; a coupling cap with a central aperture adapted to receive the inlet end of the pump therethrough and a nut releasably couplable to the input end of the pump; and an electric line couplable between the pump and the power source in the truck.

4 Claims, 3 Drawing Sheets

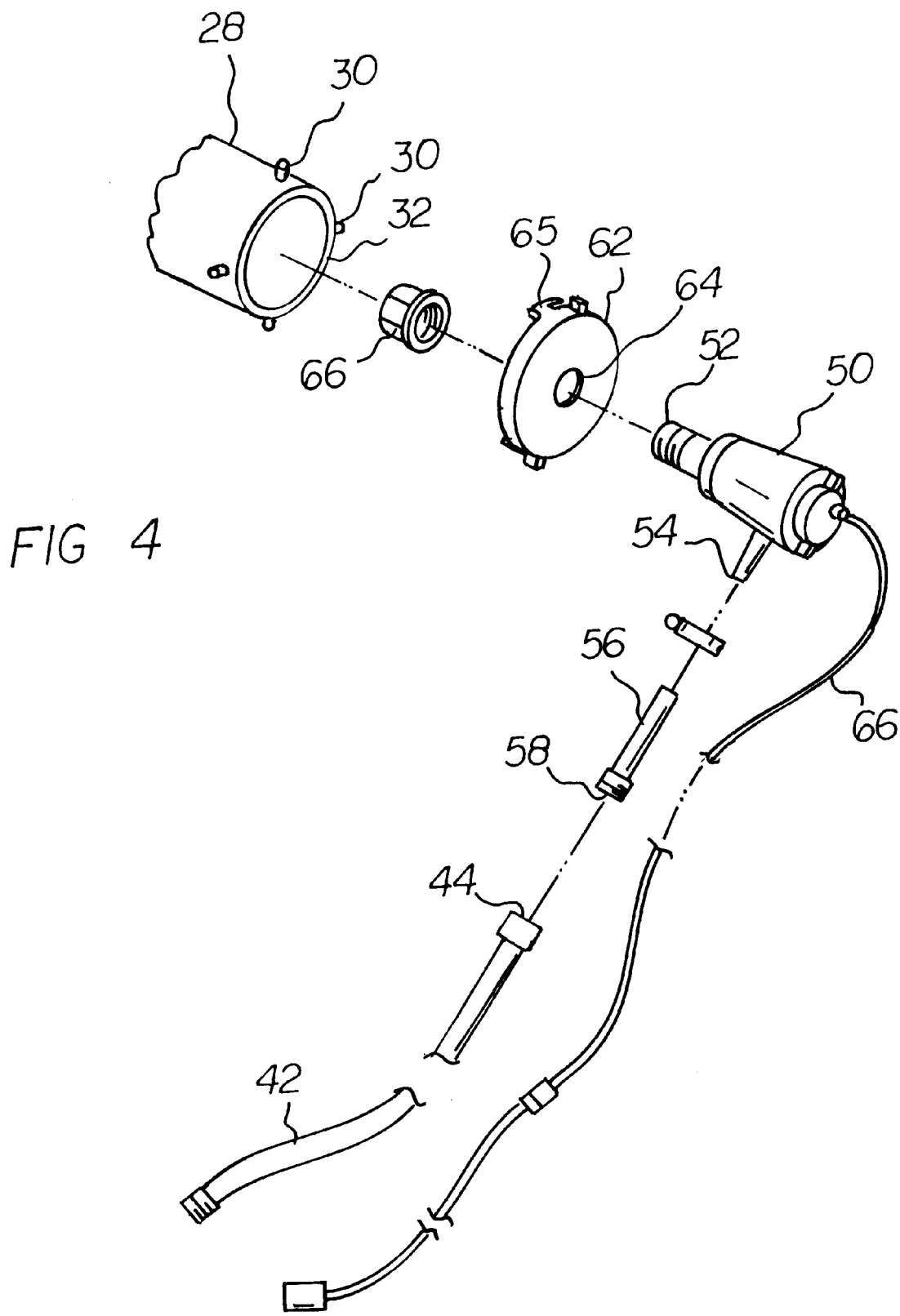

WATER HANDLING SYSTEM

BACKGROUND OF THE INVENTION

1. Field of the Invention

The present invention relates to a water handling system and more particularly pertains to handling black water, grey water and fresh water in travel trailers, 5th wheel trailers, motor homes, and the like.

2. Description of the Prior Art

The use of water handling systems of known designs and configurations is known in the prior art. More specifically, water handling systems of known designs and configurations heretofore devised and utilized for the purpose of handling various types of water are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,597,768 to Wofford discloses a holding tank for a mobile vehicle. U.S. Pat. No. 3,633,219 to Byrd discloses a prefabricated waste-receiving unit. U.S. Pat. No. 3,878,569 to Peirish, Jr., et al discloses a sewage treatment device. U.S. Pat. No. 4,400.936 to Evans discloses a method of PCB disposal and apparatus therefor. U.S. Pat. No. 4,488,752 to Broussard discloses an expandable mobile trailer. U.S. Pat. No. 4,454,613 to Palmer discloses a self-contained, compact towable facility having maximized balanced water storage, drain water collection and waste water isolation systems. U.S. Pat. No. 4,728,144 to Crean discloses a trailer construction. U.S. Pat. No. 4,736,968 to Glegg discloses a coupling device for coupling a hose to a drain pipe. U.S. Pat. No. 5,031,566 to Switzer discloses a support post system. U.S. Pat. No. 5,086,800 to Dunn discloses a multi-tank liquid variable container storage system. U.S. Pat. No. 5,206,962 to Thorwaldson discloses a waste water disposal system for recreational vehicle. Lastly, U.S. Pat. No. 5,240,600 to Wang et al discloses a water and wastewater treatment system.

Known travel trailers, 5th wheel trailers, motor homes and the like have a series of pipes that allow sinks, showers, and toilets to drain into appropriate holding tanks for subsequent disposal. In most such vehicles, the shower and sinks drain into one holding tank, a grey water holding tank; the toilet waste is routed to a separate holding tank, a black water holding tank; and a holding tank for clean or fresh water is also provided for feeding the sinks, showers and toilets. It has been found that the grey water holding tank requires drainage on a much more frequent basis than the black water holding tank. As a result, it is required that the black water holding tank be moved with its supporting vehicle on a much more frequent basis than the grey water holding tank to the great inconvenience of the user.

While these devices fulfill their respective, particular objectives and requirements, the aforementioned patents do not describe a water handling system that allows handling black water, grey water and fresh water in travel trailers, 5th wheel trailers, motor homes and the like.

In this respect, the water handling system according to the present invention substantially departs from the conventional concepts and designs of the prior art, and in doing so provides an apparatus primarily developed for the purpose of handling black water, grey water and fresh water in travel trailers, 5th wheel trailers, motor homes, and the like.

Therefore, it can be appreciated that there exists a continuing need for a new and improved Water handling system which can be used for handling black water, grey water and fresh water in travel trailers, 5th wheel trailers, motor homes, and the like. In this regard, the present invention substantially fulfills this need.

SUMMARY OF THE INVENTION

In view of the foregoing disadvantages inherent in the known types of water handling systems of known designs and configurations now present in the prior art, the present invention provides an improved Water handling system. As such, the general purpose of the present invention, which will be described subsequently in greater detail, is to provide a new and improved Water handling system and method which has all the advantages of the prior art and none of the disadvantages.

To attain this, the present invention essentially comprises a new and improved water system for handling black water, grey water, and fresh water in travel trailers, fifth wheel trailers, motor homes, and the like, comprising, in combination, a black water drain line for draining a black water tank including an operator controlled slide valve in such line; a grey water drain line for draining a grey water tank including an operator controlled slide valve in such line; a termination drain line coupling the outlets of both the black water drain line and the grey water drain line, the termination drain line having screw threads on its outlet end, with the black water drain line, grey water drain line, and termination line all being located within a travel trailer, fifth wheel trailer, motor home, or the like; a grey water tank positioned in the bed of a truck operatively associated with the travel trailer, fifth wheel trailer, motor home, or the like; a hose with a threaded inlet end and a threaded outlet end couplable to the grey water tank; a pump having a threaded inlet end and an outlet end with an adapter having threads couplable to the inlet end of the hose; a coupling cap with a central aperture adapted to receive the inlet end of the pump therethrough and a nut releasably couplable to the inlet end of the pump; a second cap to close the termination drain line with a chain to secure the second cap adjacent to the termination drain line; an electric line couplable between the pump and the power source in the truck; and a clean water tank positioned in the truck with a second hose having an outlet end couplable to a clean water tank in the travel trailer, fifth wheel trailer, motor home or the like, the second hose have an inlet end couplable to the clean water tank with a second pump coupling the clean water tank and the inlet end of the second hose and an electrical line separably couplable between the second pump and a power source within the truck.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved water handling system which has all of the advantages of the prior art water handling systems of known designs and configurations and none of the disadvantages.

It is another object of the present invention to provide a new and improved water handling system which may be easily and efficiently manufactured and marketed.

It is further object of the present invention to provide a new and improved water handling system which is of durable and reliable constructions.

An even further object of the present invention is to provide a new and improved water handling system which is susceptible of a low cost of manufacture with regard to both materials and labor, and which accordingly is then susceptible of low prices of sale to the consuming public, thereby making such Water handling system economically available to the buying public.

Even still another object of the present invention is to provide a water handling system for handling black water, grey water and fresh water in travel trailers, 5th wheel trailers, motor homes, and the like.

Lastly, it is an object of the present invention to provide a new and improved water handling system comprising a black water drain line for draining a black water tank; a grey water drain line for draining a grey water tank; a termination drain line coupling the outlets of both the black water drain line and the grey water drain line; a grey water tank positionable in the bed of a truck; a hose with a threaded inlet end and a threaded outlet end couplable to the grey water tank; a pump having a threaded inlet end and an outlet end; a coupling cap with a central aperture adapted to receive the inlet end of the pump therethrough and a nut releasably couplable to the input end of the pump; and an electric line couplable between the pump and the power source in the truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an exploded perspective view of a portion of the pump and coupling between the terminal drain and the grey water tank.

The same reference numerals refer to the same parts through the various Figures.

DESCRIPTION OF THE PREFERRED EMBODIMENT

Figure 1:
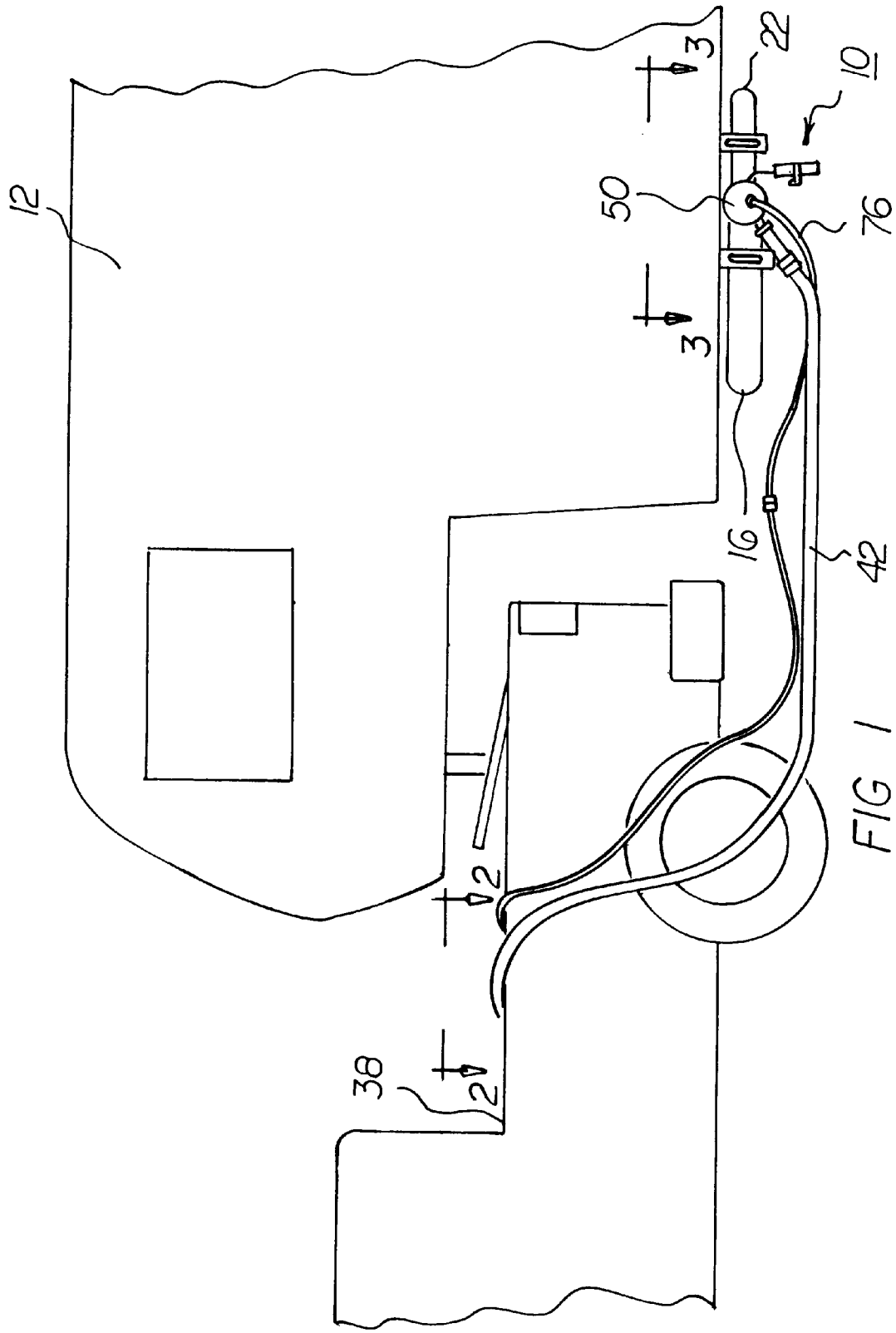
FIG. 1 is a side elevational view of portions of the water handling system constructed in accordance with the principles of the present invention.
Figure 2:
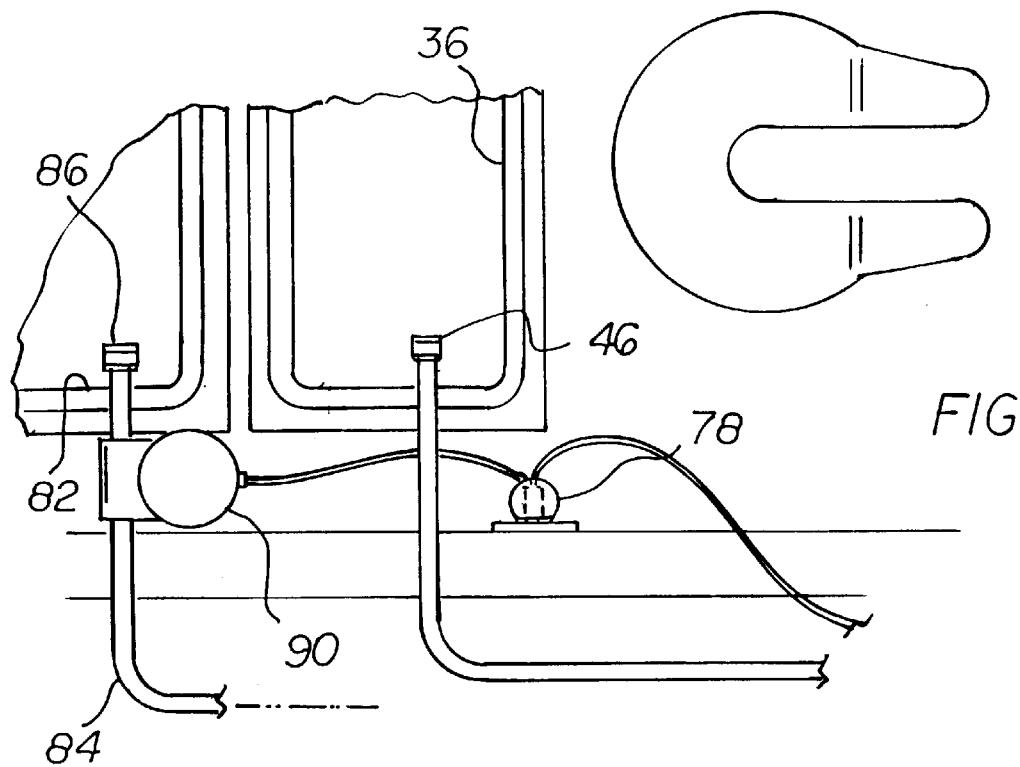
FIG. 2 is a top elevational view taken along line 2—2 of FIG. 1.
Figure 3:
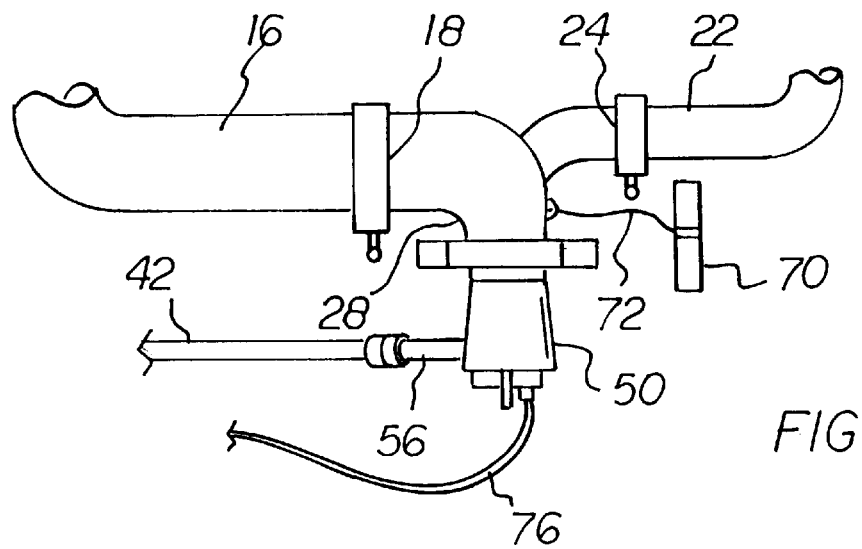
FIG. 3 is a top elevational view taken along line 3—3 of FIG. 1.

With reference now to the drawings, and in particular to FIG. 1 thereof, the preferred embodiment of the new and improved Water handling system embodying the principles and concepts of the present invention and generally designated by the reference numeral 10 will be described.

The present invention, the water handling system 10 is comprised of a plurality of components. Such components in their broadest context include a black water drain, a grey water drain line, a termination drain line, a grey water tank, a hose, a pump, a coupling cap, and an electric line. Such components are individually configured and correlated with respect to each other so as to attain the desired objective.

More specifically, a new and improved water system 10 for handling black water, grey water, and fresh water in travel trailers, fifth wheel trailers, motor homes, and the like 12. In the preferred embodiment, the system includes a black water drain line 16 for draining a black water tank including an operator controlled slide valve 18 in such line. Next provided is a grey water drain line 22 for draining a grey water tank including an operator controlled slide valve 24 in such line. Included is a termination drain line 28 coupling the outlets of both the black water drain line and the grey water drain line. The termination drain line has screw threads 30 on its outlet end 32, with the black water drain line, grey water drain line, and termination line all being located within a travel trailer, fifth wheel trailer, motor home, or the like 12. A grey water tank 36 is positioned in the bed of a truck 38 operatively associated with the travel trailer, fifth wheel trailer, motor home, or the like. A hose 42 is next provided with a threaded inlet end 44 and a threaded outlet end 46 couplable to the grey water tank. A pump 50 having a threaded inlet end 52 and an outlet end 54 with an adapter 56 having threads 58 couplable to the inlet end of the hose is included. A coupling cap 62 with a central aperture 64 is adapted to receive the inlet end of the pump therethrough. Coupling between the coupling cap 62 and the adjacent outlet end is effected by a releasable coupling featuring a pair of bayonet connectors on the coupling cap and interlocking pins extending radially outward from the adjacent outlet end of the grey water tank. Note FIG. 4.

A nut 66 releasably couplable to the inlet end of the pump are also provided. A second cap 70 closes the termination drain line. A chain 72 secures the second cap adjacent to the termination drain line. An electric line 76 is couplable between the pump and the power source 78 in the truck. A clean water tank 82 is positioned in the truck with a second hose 84 having an outlet end 86 couplable to a clean water tank in the travel trailer, fifth wheel trailer, motor home or the like. The second hose has an inlet end 88 couplable to the clean water tank. A second pump 90 couples the clean water tank and the inlet end of the second hose. An electrical line is separably couplable between the second pump and a power source within the truck.

The grey water disposal system is operated as hereafter described. First the trailer termination cap is removed. Next the modified cap with pump attached is installed and a 25 foot garden hose is attached to the pump the opposite end of hose is run to the tank in back of the truck. Next the grey water drain valve on trailer is opened and 12 VDC lines are connected from the pump to the truck. The pump is then started and run until trailer grey water tank is empty or the tank on the truck is full. Next the trailer grey water valve is closed, the pump, hose and wiring are disconnected. The truck is then driven to a dump station and the pump assembly with hose attached is placed in the tank. The pump can be submerged. The tank is then pumped until empty. In the alternative the tank may have a drain attached to it and draining may be accomplished by gravity. The tank can be used for storage when not being used to transport grey water.

The fresh water pump is modified to install in a tank suitable to haul drinking water. The discharge side of the pump will accept a garden hose. Operation is accomplished as follows. The truck is driven with tank to available water. The tank is filled. The truck with tank is then returned to the trailer. The garden hose is attached to pump discharge and pump into trailer fresh water tank.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved water system for handling black water, grey water, and fresh water in travel trailers, fifth wheel trailers, motor homes, and the like, comprising, in combination:

a black water drain line for draining a black water tank including an operator controlled slide valve in such line;

a grey water drain line for draining a grey water tank including an operator controlled slide valve in such line;

a termination drain line coupling the outlets of both the black water drain line and the grey water drain line, the termination drain line having screw threads on its outlet end, with the black water drain line, grey water drain line, and termination line all being located within a travel trailer, fifth wheel trailer, motor home, or the like;

a grey water tank positioned in the bed of a truck operatively associated with the travel trailer, fifth wheel trailer, motor home, or the like;

a hose with a threaded inlet end and a threaded outlet end couplable to the grey water tank;

a pump having a threaded inlet end and an outlet end with an adapter having threads couplable to the inlet end of the hose;

a coupling cap with a central aperture adapted to receive the inlet end of the pump therethrough and a nut releasably couplable to the inlet end of the pump;

a second cap to close the termination drain line with a chain to secure the second cap adjacent to the termination drain line;

an electric line couplable between the pump and the power source in the truck; and a clean water tank positioned in the truck with a second hose having an outlet end couplable to a clean water tank in the travel trailer, fifth wheel trailer, motor home or the like, the second hose have an inlet end couplable to the clean water tank with a second pump coupling the clean water tank and the inlet end of the second hose and an electrical line separably couplable between the second pump and a power source within the truck.

2. A water handling system comprising:

a black water drain line for draining a black water tank including an operator controlled slide valve in such line;

a grey water drain line for draining a grey water tank including an operator controlled slide valve in such line;

a termination drain line coupling the outlets of both the black water drain line and the grey water drain line, the termination drain line having screw threads on its outlet end;

a grey water tank positionable in the bed of a truck;

a hose with a threaded inlet end and a threaded outlet end couplable to the grey water tank;

a pump having a threaded inlet end and an outlet end with an adapter having threads couplable to the inlet end of the hose;

a coupling cap with a central aperture adapted to receive the inlet end of the pump therethrough and a nut releasably couplable to the input end of the pump; and an electric line couplable between the pump and the power source in the truck.

3. The system as set forth in claim 2 and further including a clean water tank positioned in the truck with a second hose having an outlet end couplable to a clean water tank in the travel trailer, fifth wheel trailer, motor home or the like, the second hose have an inlet end couplable to the clean water tank with a second pump coupling the clean water tank and the inlet end of the second hose and an electrical line separably couplable between the second pump and a power source within the truck.

4. The system as set forth in claim 2 and further including a second cap to close the termination drain line with a chain to secure the second cap adjacent to the termination line.

* * * * *